Patented Nov. 13, 1928.

1,691,439

UNITED STATES PATENT OFFICE.

EMIL GUSTAF TORVALD GUSTAFSSON, OF STOCKHOLM, SWEDEN, ASSIGNOR TO HAMPUS GUSTAF EMRIK CORNELIUS, OF HAMNGATAN I A, STOCKHOLM, SWEDEN.

PROCESS FOR PRODUCING METALS IN ELECTRIC FURNACES.

No Drawing. Application filed March 31, 1926, Serial No. 98,915, and in Sweden May 16, 1925.

The present invention refers to processes for producing metals in an electric furnace having one or more electrodes and especially to processes, for instance for producing iron and iron alloys, in which a metalliferous charge is melted, if desired, in combination with or after reduction of same, in an electric furnace of the type described under formation of metal and slag.

The main object of the invention is to bring about an effective protection of the furnace, especially the bottom thereof, against destructive action of the electric arc or arcs between the electrodes or between an electrode and the bottom. To this end a pre-charge is introduced in the furnace adapted to act as an insulator between the electric arc or arcs and the bottom of the furnace, until a sufficient quantity of charge is introduced, said pre-charge being, if desired, also adapted to act as a distributor of said charge. As insulator in this case is meant a material that on account of its characteristics is able to withstand the effect of the arc and properly to cover the parts of the furnace which would be destroyed if subjected to the concentrated heat, produced by the electric current in the arc.

Another object of the invention is to provide a process for producing metals in an electric furnace having electrodes, consisting in melting a metalliferous charge in the furnace, emptying the furnace from metal and slag and introducing into the furnace a slag, preferably in a molten state, in order to protect the furnace against the electric arc, until a sufficient quantity of the next charge has been introduced. The pre-charge or slag introduced may consist of the slag tapped from the furnace, but any suitable slag may also be used. If the bottom of the furnace is in want of repair, when metal and slag have been tapped out, such repair is to be carried out before introducing the pre-charge or slag into the furnace, the repairing material being preferably sintered on the bottom of the furnace by means of the electric current.

The advantages of a process according to the present invention are evident. When the furnace is empty and especially when using electrodes directed downwardly, the bottom of the furnace will be exposed, in the beginning of each melting operation, to a very strong corrosive action of the electric arc or arcs directed against the bottom, if said bottom is not suitably protected against such an action. A suitable protecting material is the slag formed during the melting operation in the furnace or any other suitable slag introduced in a suitable quantity, if necessary after the furnace has been repaired or fettled, said slag covering the bottom proper below the electrodes and preventing the electric arc or arcs from striking against said bottom. Preferably, slag from the previous melting operation is used, the furnace being then, already from the beginning, brought into the condition which will arise after a quantity of charge has been melted in the furnace. Moreover, on using a charge having a lower specific weight than the slag, said slag will form a suitable bath in which the charge will float causing, already from the beginning, an even distribution of the charge over as great part of the bottom of the furnace as possible. The charge, absorbing a considerable amount of heat, will consequently to a great extent protect the bottom. If, on the contrary, the charge is fed into the furnace onto an empty bottom, it will chiefly accumulate below the feeding devices, whereas the other parts of the bottom will be unprotected.

By introducing a pre-charge or slag into the furnace according to the present invention it will be possible, in using vertical or inclining electrodes, to lower the ends of the electrodes into the slag and to run the furnace by resistance already from the beginning of the melting operation, if desired. Should the slag introduced be somewhat colder than is desirable, the furnace is preferably heated to the required temperature by running with arc or resistance before introducing metalliferous charge for the next melting operation.

By entirely emptying the furnace on tapping, the bottom of the furnace will be accessible for inspection and may be fettled, if necessary.

It may be conceived that the object of the present invention may be attained in a simpler way than described by leaving a quantity of slag in the furnace on tapping, but this would in many respects be to great disadvantage. In whatever way the tapping may be carried out, the bottom of the furnace would not be accessible for inspection and repair between the melting operations, and moreover metal and slag would easily remain in cavities or grooves in the bottom, which will be very disadvantageous, especially, for instance, when metals having different percentages of carbon or different alloyed metals are to be produced in the different melting operations. On using a tapping opening disposed below the normal level of the metal and slag bath, it will be very difficult, when leaving a quantity of slag in the furnace, to effectively close up the tap hole, as slag will have a tendency to remain in the tap hole, said slag being sometimes mixed with metal which will then easily melt when a new charge is melted causing a cutting up of the tap hole in undue time, whereby the contents of the furnace may easily be lost.

The invention may especially be applied to processes for producing iron and steel and iron alloys directly out of oxide ore or ores in which, for instance, a charge is reduced or melted in the electric furnace, said charge consisting of a mixture of finely divided ore and finely divided carbonaceous material transferred into briquettes or other lumps by using a binding agent, if desired, the ore and carbon particles being fixed in position in relation to one another in said briquettes or lumps, said fixing being facilitated, if desired, by drying the briquettes or lumps. Hereby the best results will be obtained by introducing into the furnace said briquettes or lumps continuously or with frequent intervals of time and reducing and melting same whilst floating on the top of and in the slag bath formed during melting or in another way. The gangue of the ore, the residues of reducing material, binding agent and flux that may have been added will thereby form a considerable quantity of slag in the furnace, which is to be removed from the furnace on tapping each charge.

The invention is also to great advantage when applied to processes for producing iron or iron alloys from spongy iron reduced from iron ore or the like, for instance by means of solid carbon or carbonaceous gases, and then melted and transferred into iron, steel or iron alloys in an electric furnace which may be the same furnace in which the reduction into spongy iron takes place or another furnace. The spongy iron contains the whole amount of gangue of the ore and also additions that may have been made to the ore, for instance for briquetting or sintering purposes previous to the reduction. Fluxing material has to be added to the charge in most cases in order to form a suitable slag together with the gangue. If the composition of the slag is suitably chosen, the porous lumps of spongy iron will float on top or within the slag bath in the furnace. In these processes the same methods of treatment may preferably be used as in the processes for producing iron directly out of ore as mentioned above. Also in such cases where the spongy iron would not float in the slag on account of being too heavy, for instance due to a higher degree of pressing, the adding of slag after tapping for the purpose of protecting the bottom of the furnace will be to great advantage.

The process according to the invention is, of course, applicable whether the electric furnace be stationary or tiltable, that is to say whether the furnace is adapted to be tapped through a tap hole at the bottom or through a lateral opening. Tiltable furnaces have the advantage that they can be emptied entirely, even if the bottom of the furnace has been corroded to a considerable degree, whereas in a furnace having at the bottom a tap hole for the metal, part of metal and slag will easily remain in grooves and cavities below the level of the tap hole.

On tapping, the metal and slag which flow out partly admixed with one another are preferably tapped into a ladle or the like provided with an over-flow so as to permit the main bulk of the slag to flow through the over-flow into a separate slag ladle or the like, whereas the metal will remain in the first ladle. Preferably, the slag ladle is provided with tilting means, bottom tapping means or the like, so that the slag may easily be tapped out of the same and back into the furnace. If the slag has a tendency to solidify in the ladle in a too high degree, the slag may be heated in said ladle by means of electric heat, for instance an electric current passing from an electrode immersed in the slag from above and a graphite block, iron rod or the like, disposed at the bottom of the ladle and serving as second electrode. In order to prevent the slag from being cooled too rapidly, it is also possible to store the ladle in a closed chamber, furnace or the like, until the slag is to be returned into the furnace, which chamber or furnace may be provided with heating means. The speed of solidification of the slag in the ladle may also be decreased by throwing coal-breeze onto the surface of the slag.

In tiltable furnaces the first ladle for the tapping may preferably consist of a ladle similar to those used on tapping Bessemer converters, said ladle being attached in known manner at the mouth of the tap flute or hole and which ladle will be filled with metal and slag at the tilting of the furnace. The metal is tapped into moulds or the like through a tap hole provided with nozzle and stopper, whereas the slag will remain in the ladle, or it may flow out partly through an over-flow of the ladle. By restoring the furnace into normal position a suitable quantity of the slag may be returned into the furnace. If it is necessary to fettle the furnace, the ladle is removed, and after the repairing slag is introduced into the furnace through the bottom tap hole of the ladle.

If the metal obtained in the melting operation is to be refined before tapping, it is preferred to remove wholly or partly the slag formed during melting previous to the refining process. Then, before the metal is tapped, it is refined in known manner by using a refining slag or slags of suitable composition. After the furnace has been emptied, a suitable quantity of the slag from the melting operation is introduced to protect the bottom of the furnace. As the refining process and the fettling of the furnace may require a considerable time, it is preferred to keep such slag in a molten state during the intermediate time.

On introducing the slag into the furnace it is to be supplied under certain precautions so as to prevent the slag jet from causing corrosions in the sides and bottom of the furnace or from splashing. If the roof and the slag are different in regard to the proportions between their acid or basic constituents, such splashing may be destructive for instance if the slag is basic and the material in the roof is acid, in which case splashing of slag onto the roof may cause corrosion of same.

If the furnace is tiltable and is emptied through a lateral opening, the slag is preferably supplied through said lateral opening. If the furnace is held in an inclined position towards the tapping side thereof, the slag will enter the furnace in an even flow along the wall and downwards against the bottom. In such case no corrosion will take place due to striking force of the slag jet. If the furnace is stationary, the slag is supplied through a lateral opening or through an opening in the arc. In order to decrease the striking force of the slag jet and the splashing of the slag, an iron rod may be extended through the intake downwardly to the bottom of the furnace, and along said iron rod the slag is then poured into the furnace. The slag will flow with such an arrangement much more quiet and even than if introduced in a free jet.

The invention is not limited to the metals or the means for tapping the furnace and for re-introduction or heating of the slag as described above but comprises all methods and means to which the method described of protecting the bottom of the furnace is applicable.

What I claim as new and desire to secure by Letters Patent of the United States of America is:—

In the manufacture of metals in electric furnaces under practically continuous operation, the steps consisting in charging the furnace with a metalliferous charge and smelting said charge with the aid of electric heat while forming metal and slag, emptying the furnace to bare the bottom thereof, reintroducing a quantity of the slag substantially in its original tapped condition for protection of the furnace bottom against the action of the electric arc, and starting the charging for the next heat.

In testimony whereof I affix my signature.

EMIL GUSTAF TORVALD GUSTAFSSON.